July 15, 1941.　　　A. A. RUBLY　　　2,249,176
REMOTE CONTROL GEARSHIFT
Filed April 19, 1937　　　4 Sheets-Sheet 1

Inventor
Arthur A. Rubly
By Blackmore, Spencer & Hink
Attorneys

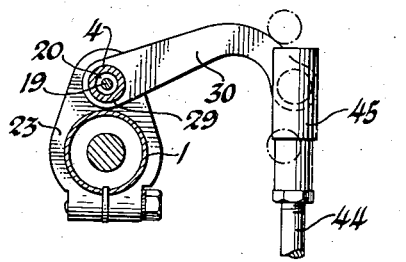
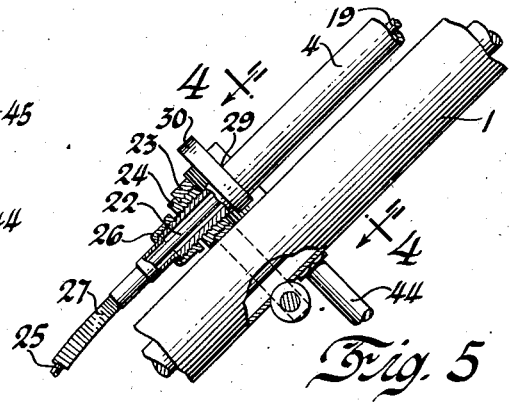
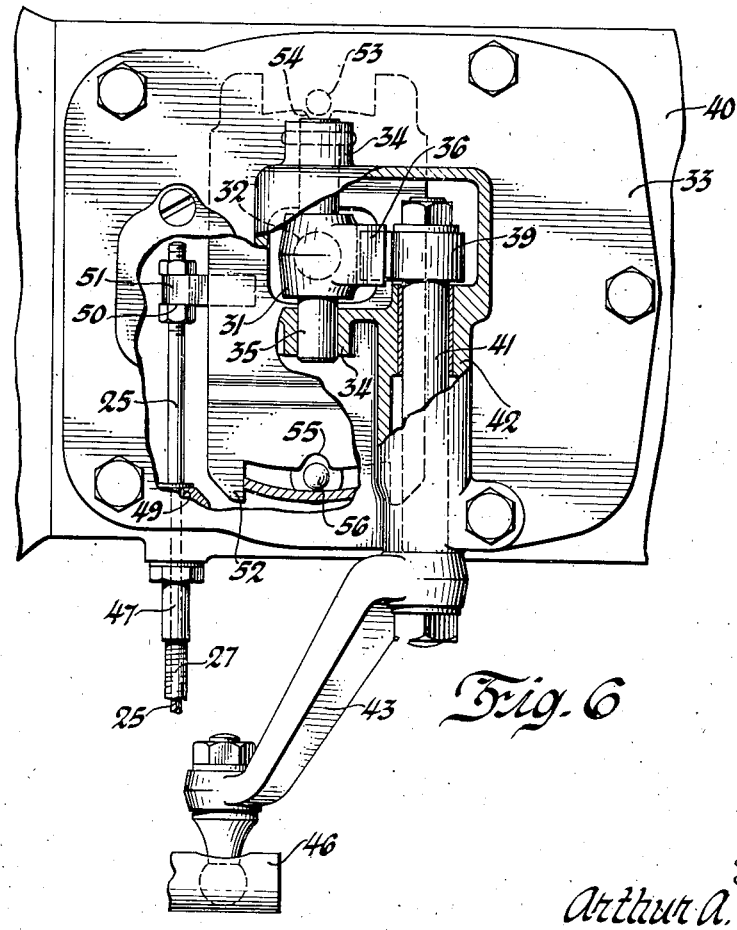

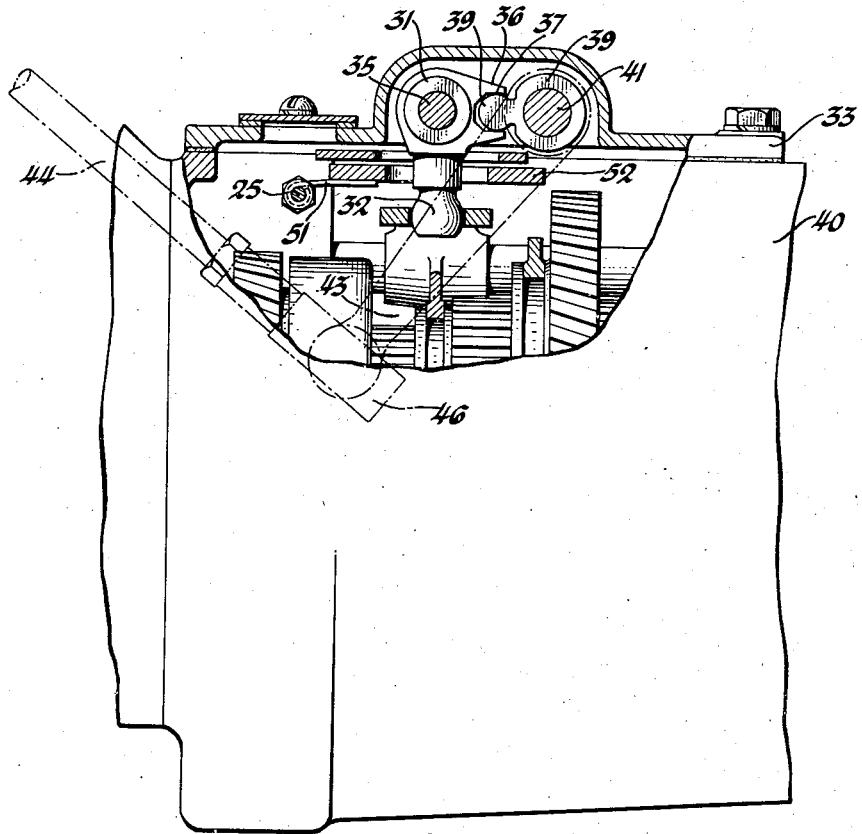
Fig. 7
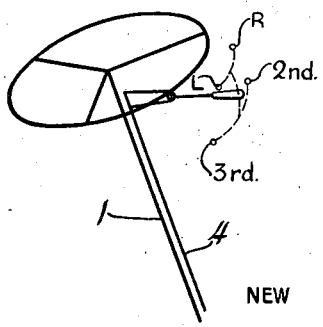
Fig. 8 NEW
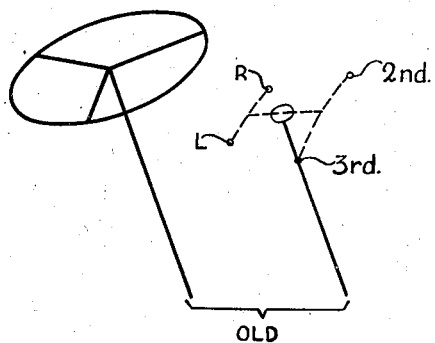
Fig. 9 OLD
Inventor
Arthur A. Rubly
By Blackmore, Spencer & Flint
Attorneys Patented July 15, 1941

2,249,176

UNITED STATES PATENT OFFICE 2,249,176

REMOTE CONTROL GEARSHIFT

Arthur A. Rubly, Farmington, Mich., assignor to General Motors Corporation, Detroit, Mich., a corporation of Delaware Application April 19, 1937, Serial No. 137,648

16 Claims. (Cl. 74—484)

The present invention relates to remotely controlled gear engagement and disengagement selection and operation, or actuation, and pertains specifically to conveniently mounted linkage which will not interfere with ingress and egress of passengers or driver to the front seat of a motor vehicle, nor with the leg room of such passengers.

An object of the invention is to provide a gear changing mechanism having a single or unitary control for preset selection of change speed gear groups, and for actuation within such groups, the respective motions from such control being transmitted to members within the gearbox through separately acting paths of motion.

A further object is to transmit the preset selection through yielding or flexible means of such character that the customary torque reaction movements of present day rubber mounted powerplants including change speed gearing assemblies, will not be of sufficient amplitude to disturb the settings of the permitting mechanism of the type known in this art as the interlock member.

An additional object is the coupling of the hand control with shifting members within the gearbox, providing positive shift actuation for engagement and disengagement through linkage which permits limited lost motion in two degrees of movement, thereby rendering the shifter mechanism as a whole free from wrong motion resulting from relative rocking of axial movement of the powerplant with respect to the frame upon which the driver control is mounted.

In the examples shown, I describe one of the shift control elements as a Bowden wire, but the invention as disclosed may be used with a flexible shaft or flexible cable as a mechanical equivalent, as will be evident in the following description.

Other objects and structure details will appear from the following description and associated drawings of this specification, in which:

Figure 4 is a plan view in partial section of the driver control connected elements of Figure 1 at the lower end of the steering column, on line 4—4 of Figure 5. Figure 5 is an elevation view of the control parts assembly at the lower end of the steering column of Figure 1.

Figure 6 is a plan view of the transmission of Figure 1, the cover plate being shown broken away to show the connections to the ratio shifter elements.

Figure 7 is a vertical view of the gearbox of Figure 6, broken away to disclose the internal relationships of the ratio shifting elements.

Figure 8 is a schematic diagram of the driver control shifter motion of my invention, as compared with Figure 9 which describes the common shifter pattern of present day transmission controls.

Figure 10 is a modification of the control arrangements of Figures 1, 5 and 6, wherein certain changing of the control members are made, and certain elements dispensed with.

Figure 1:
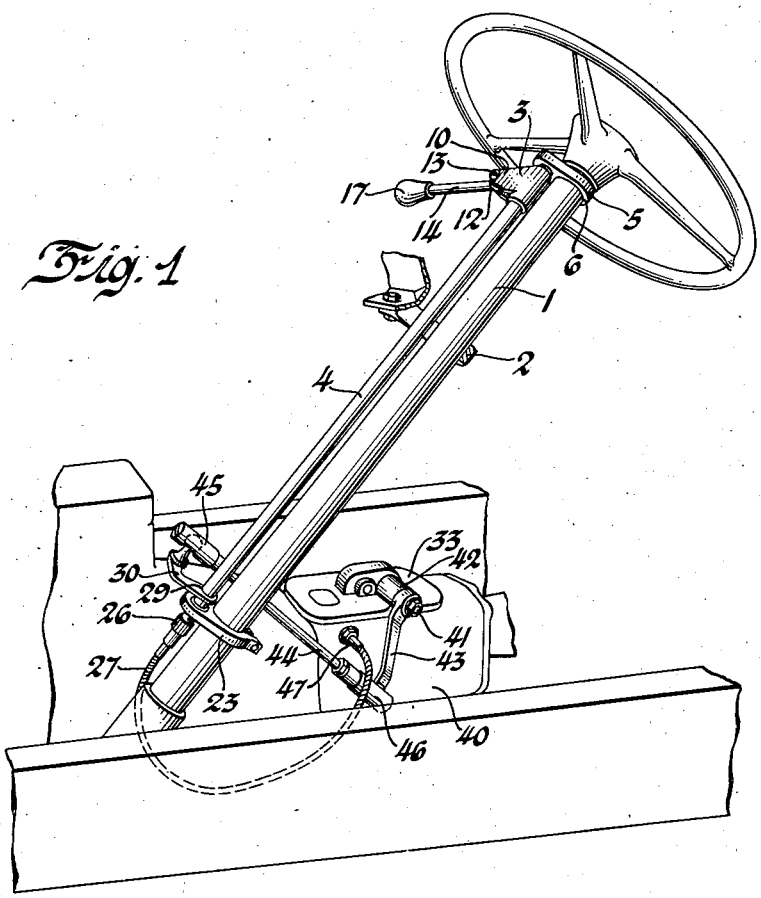
Figure 1 is a perspective view of an exemplary installation of my invention in the chassis of a motor vehicle, the driver controls mounted in conjunction with the steering column jacket; the shifter arrangement being shown attached to a standard form of gearbox.

The present specification covers a complete description of control mechanism remotely placed, connected through appropriate mechanical linkage to gearbox members of wide present day use and common form, and it is not deemed necessary to describe herewith the complete gearing and gearbox mounted shifter structure, except insofar as the elements of my invention are directly attached to or related therewith.

The example of the present disclosure is applied to a standard manually shifted three-speeds forward and reverse gearbox in which the standard H pattern of shift is utilized, the various positions from the driver's seat of the H portions being as follows:

| Gear lever position | Speed ratios | Preset |
|---|---|---|
| Mid | Neutral | No fulcrum. |
| Left-rear | Low | Right fulcrum. |
| Left-front | Reverse | Do. |
| Right-front | 2nd | Left fulcrum. |
| Right-rear | Direct | Do. |

Showings in which the preset mechanism and shifter structure of my application are detailed and described in issued U. S. patents; e. g., U. S. 1,886,484, Tenney, filed Oct. 19, 1931, issued Nov. 8, 1932; U. S. 1,886,849, Tenney and LeGros, filed Nov. 2, 1931, issued Nov. 8, 1932; and U. S. S. N. 91,073, Tenney, filed July 17, 1936, wherein various forms of the interlock plate combination in manually controlled gear change presetting and manual actuation of such standard forms operated by direct mechanical linkages are given.

In Figure 6 the outline of interlock plate 52 is given, with the fulcrum pins 53—56 indicated. To coordinate my invention with this form of device, I will give herewith the relative motions of the various parts.

The interlock plate 52 is free to move laterally under the coverplate 33 of the gearbox 40, within limits, and notch 54 may intersect pin 53, or else notch 55 may intersect pin 56. If the plate 52 is moved right from the transmission centerline, notch 54 and pin 53 engage, and subsequent fore-and-aft motion of the shifter mechanism fulcrums on pin 53, the actual permitted shift movement taking place at the opposite side of the gearbox.

The same type of action occurs when the plate is moved left from the transmission centerline, except now the pin 56 becomes the fulcrum, and the permitted shift actuation occurs at the opposite or right side of the gearbox.

While in the common types of shift determining arrangements noted above one gearshift lever moves both the interlock plate and the shift actuator parts, in my invention I divide these two motions from a master control through two connections or control paths, although the master control itself is single or unitary; and I arrange the control to move through two distinct ranges of different directional motion, each manipulating the preset and shift actuation connected parts separately.

In the following description, the rightward movement of the interlock plate 52 from mid-position presets the shift actuation mechanism for low or reverse gear, and the leftward movement presets for 2nd speed or direct drive, as is common in gearboxes of this type. Subsequent movement of element 31 fore-and-aft may thereafter actuate these speed ratio shifts according to the standard pattern.

Based on the above, the following description of the elements and operation of my invention is herewith given.

In Figure 1, the steering column jacket 1 of the vehicle used in my example is supported by the bracket 2 in the dash framework of the body of the vehicle, tilted at an appropriate angle for convenient driver operation.

The transmission selector head 3 attached to hollow shaft 4 is supported by bracket member 5 attached to the steering column 1 at 6, member 5 forming a bearing seat at 7 for bushing 9, permitting rotation. Under the bearing portion 7 of bracket 5, extension head 3 attached to shaft 4 rotates with the shaft in a plane at right angles to the axis of the shaft.

Extension 3 is hollow, and at its outer end 10 is drawn to a socket seat 11 for ball 12 pivoted laterally by pin 13. Shifter member 14 consists of a lever attached to ball 12, and extending inwardly through the extension 3 to aperture 15 in hollow shaft 4, where concentric rod fitting 16 attached to lever 14 may move through a limited range of motion in the axis of hollow shaft 4.

Rocking motion of the handle 17 of the lever 14 in the plane of the hollow shaft 4 as shown in dashed lines a reciprocates lever 14 through the center of ball 12, fitting 16 moving inversely thereto in the axis of shaft 4.

Swinging motion of handle 17 about the center of shaft 4 rotates the latter, so that a two directional movement of the handle is divided into a rotational component applied to the shaft 4 and an axial component applied to the fitting 16.

Sliding rod 19 occupies the hollow bore 20 of shaft 4 and is formed at 16 to grip the ball end 21 of lever 14 with permitted limited lost motion so that the circular movement of lever 14 about the center of rocking ball 12 may be compensated for.

The rod 19 does not require bearing fit in the upper end of bore 20 but is restrained at its lower end 22, where it is attached to Bowden wire 25. Hollow shaft 4 is supported in the frame by bracket 23 in bushing 24 at its lower end, and the shaft 4 carries Bowden wire sleeve coupling 26, so that wire 25 may slide longitudinally in sleeve 27 with the end of the latter securely held.

Curved arm 30 is attached to hollow shaft 4 at 29 and moves rotationally with the shaft, while wire 25 reciprocates in sleeve 27 with axial motion of rod 19 and fitting 16.

Figures 6 and 7 show the details of the shifting mechanism of a form of variable speed transmission, applied to a standard type of gearbox.

The bellcrank element 31 has cam 32 corresponding to the cam end of the types of shifter mechanisms mentioned preceding. Element 31, however, is arranged to rock in the fore-and-aft vertical plane of the gearbox 40 only, coverplate 33 supporting bosses 34 in which cross shaft 35 is pivoted, thus limiting the movement of element 31 as described.

The opposing bellcrank end 36 of element 31 extends at right angles to the cam end 32, toward the rear of the gearbox, and is formed into a transverse follower slot 37, shaped to engage cam head 39. Cross shaft 41 is likewise mounted in the coverplate 33, supported for bearing and rotation in bosses 42, protruding at the side of the gearbox, where attached lever 43 may swing the shaft. Cam head 39 is attached to shaft 41 at its inner end, and is arranged to rock shaft 35 and element 31 in the vertical plane, in consonant motion.

Within the allowed range of movement of shafts 35 and 41, there can be no demeshing of slot 37 and cam head 39. Lever 43 may move clockwise or counterclockwise from a mean mid-position, the first motion resulting in cam 32 of element 31 moving toward the rear of the gearbox, and the second causing a reverse movement toward the front or engine end of the gearbox.

Longitudinal shifting rod 44 connects curved arm 30 to lever 43 through ball couplings 45 and 46 at either end to permit lost motion in two degrees of movement as stated in the preamble of this specification.

When handle 17 swings about the axis of shaft 4, arm 30, rod 44 and lever 43 transmit the motion to shaft 41 through cam 39 and slot 37 to shaft 35 and cam 32. Movement of 17 from a central or neutral position upward and away from the observer as in Figure 2 rotates shaft 4 counterclockwise, as well as arm 30, imparting a forward motion to rod 44 and clockwise movement of lever 43, shaft 41 and cam 39. The arm of slot 37 and the arm of cam 32 rotate counterclockwise about the center of shaft 35, and cam 32 therefore moves rearward from its mid position.

Figure 2:
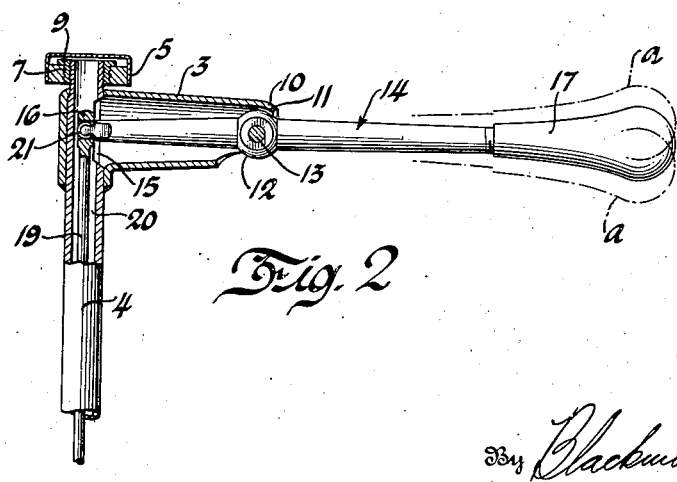
Figure 2 is a partial section taken through the driver control arrangement of Figure 1.
Figure 3:
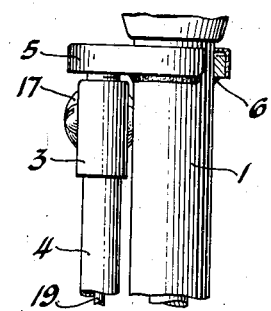
Figure 3 represents the detail of bracket mounting of the parts of Figure 2.

Movement of handle downward and toward the observer, as in Figure 2, through the described mechanism shifts cam 32 forward from its mid position. These described motions are all provided through straight or direct mechanical linkages between the manually operated handle 17 and the mechanical elements within the gearbox which establish the shift of ratio actuated by the secondary rotational movement of the handle 17.

Wire sleeve 27 is fastened to the left side of the gearbox at fitting 47, and wire 25 enters drilled hole 49, being attached at 50 to clip 51, movable transversely of the main axis of the gearbox.

As described in the issued United States patents noted preceding, the transmission shifter element commonly known as the interlock plate is movable transversely by the commonly known gear lever, when the latter is rocked across the customary bar of the H-shifter pattern, to establish one or another fulcrum for the subsequent motion of the gearlever to shift to one of the gear positions determined by the legs of the H-shifter pattern. Since this construction is well-known and in universal use in the automotive industry, it is not deemed necessary to describe the complete details of the specific shifter mechanism beyond the laterally movable interlock plate 52 and the fore-and-aft moving cam member 32.

As in the constructions noted preceding, the movement of interlock plate 52 from a mid position toward the right of the gearbox, or from the eye of the observer in Figure 7, sets the fulcrum for the shift motion at that side of the gearbox, permitting fore-and-aft shift movement on the opposite, or left side of the gearbox only, where the shifter forks for the customary low forward and reverse gears are moved, so that the succeeding fore-and-aft motion may engage either of these gears.

Attention is again directed to the fact that element 25, which is attached to clip 51, may be of any commercial form of flexible shaft or flexible cable, the requirement mechanically being that positional translation motion between element 14—19 and plate 52 occurs with a reasonable degree of accuracy.

Conversely, movement of the interlock plate 52 from a mid-position toward the left of the gearbox, or toward the eye of the observer in Figure 7, sets the fulcrum at that side of the gearbox, permitting only the movement of the 2nd-direct shifter fork with the subsequent fore-and-aft motion.

In my invention, the shifter functions are divided, the Bowden wire 25 through clip 51 controlling the lateral movement of the interlock plate 52, as shifter handle 17, rod 19 and wire 25 reciprocate. The swinging motion of handle 17 about the axis of shaft 4 provides the actual mesh and demesh shifting of the gears.

The true function of the interlock plate 52 is that of a prior action, or prior selection before shift to or from any gear driving position.

As is well known, unit powerplants including gearbox assemblies are in present day motor cars, mounted in rubber or in flexible supports for absorbing both rotational torque reaction and longitudinal thrust. In my gear control arrangement, it is necessary to combine the elements in such a way that relative motion between the yieldingly supported powerplants and the chassis members attached to the body or frame is compensated for without jamming the shifter elements, or reactive shift of the driver's control or of the shift actuation elements within the transmission.

This is accomplished in my invention by utilizing a predetermined length of Bowden wire between points 26 and 47 with respect to the allowed positional limit range of fitting 16 and clip 51, such that the full amplitude of torsional rocking of powerplant in terms of radial distance from the rocking center to clip 51 does not exceed the normal degree of yield of the wire and sleeve between the points 26 and 47. In this way, an optimum condition is maintained in the system.

The full shift range of clip 51 is greater than twice the amplitude of rotational torque motion of clip 51 about the rocking center. Normal longitudinal shifting of the powerplant does not affect the position of clip 51 because of the limited yielding of sleeve 27 and wire 25.

As viewed from the driver's position, the hollow shaft 4 is directly behind the steering column jacket 1, and extension head 3, and handle 17 project to the right of the driver as in Figure 8.

It will be noted that the general plane of shift of the described invention is vertical, as compared with the customary gearshift devices now in common use. This reduces the necessary space allowance for the full range of motion of the shifter handle to a small zone in the vertical plane, believed to be of novel advantage. It is obvious that with two passengers and the car driver in the front seat of a present day motor car, my invention permits greater use and comfort because of greater leg-room allowance. Figures 8 and 9 describe the above comparison. The actual space motion of handle 17 of Figures 1, 2, 8 and 9 is in the surface of a torus whose long radius is the arm 21—17, and whose short radius is the arm 13—17, the plane of the torus meeting the steering column perpendicularly.

Figure 10:
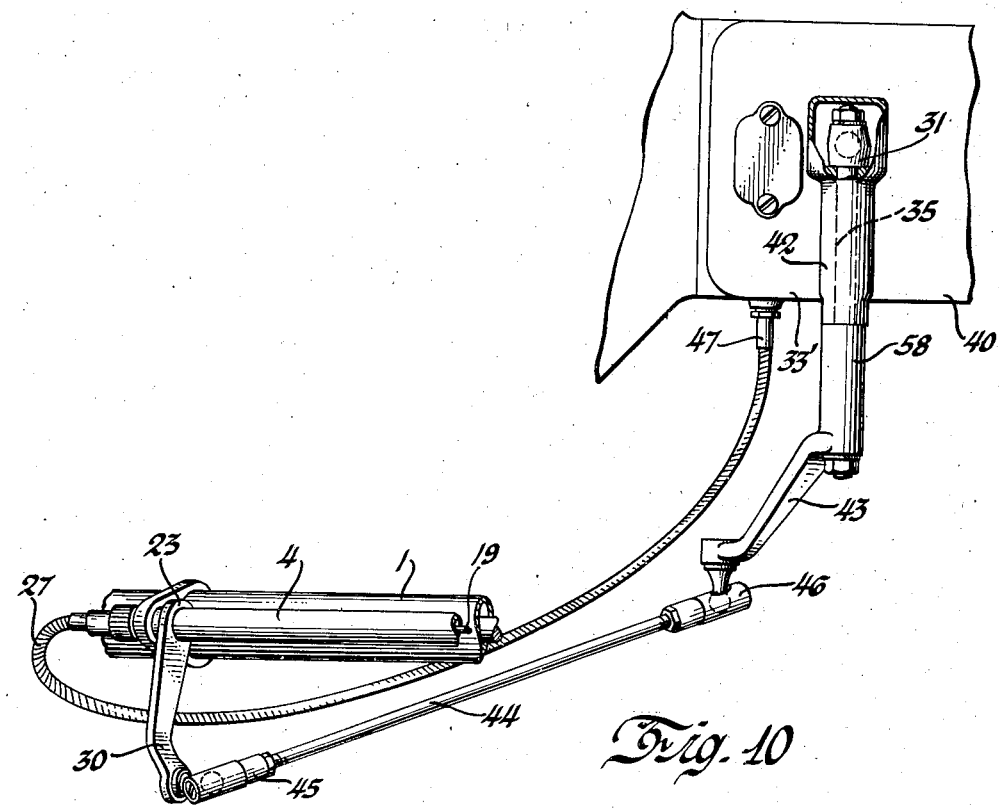
Figure 11:
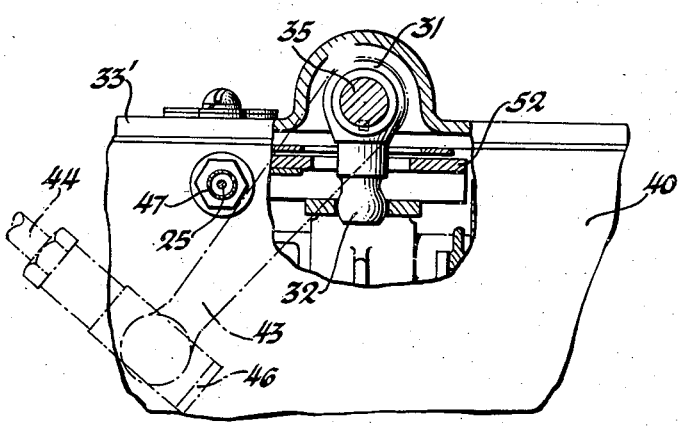
Figure 11 represents an elevation view of the modification structure of Figure 10, at the side of the gearbox, the Figure 11 being similar to Figure 7.

Throughout the operation of rocking the handle 17 in the vertical direction for presetting the interlock plate 52 to traverse for setting up the shift actuation for the low-reverse or the high-2nd groups, and the operation of rocking or rotating the handle 17 for swinging the bellcrank element 31 in the fore-and-aft direction for definite shifts to and from those gear drives, the motion is free and the shifts easy to manipulate, the adapting of the operator movement to the tilted vertical plane, or toroidal surface being readily made; the needed shift displacement space in no way interfering with the full use of the leg space in the front compartment of the car. In the modification of Figures 10 and 11, the crank arm 30 is attached to shaft 4 at an angle 180 degrees from that of Figure 1, so that a clockwise rotation of shaft 4 from neutral produces a pull on rod 44 instead of a thrust as in Figure 1. The connections of rod 19, wire 25 in sleeve 27 to interlock plate 52 are the same as in Figures 1, 2, 5 and 6.

In Figures 10 and 11, certain parts of Figures 6 and 7 have been dispensed with, and lever 43 is attached directly to shaft 35, in turn attached to element 31 integral with cam 32. A different cover plate 33', however, is required, to support shaft 35 only in boss 42. Spacer collar 58 is simply for extending the location of attachment of rod 44 for convenience.

The operation of this form of my invention is identical with that preceding, except that for shifts from neutral to reverse or 2nd, the rod 44 is in compression instead of tension, and for shifts from neutral to low or direct, it is in tension instead of compression. There are, of course, a lesser number of parts, with a greater degree of driver feel, because of less lost motion, the lever linkage from 17 transmitting force directly to cam 32.

It seems apparent that my invention provides a simple, useful, and effective means for presetting and shift actuation of change speed gearing in accordance with diverse movements of a master shift control, for present day types of change speed gearing, with compensation allowances for relative torque movements of powerplant with respect to the vehicle framing.

It will be understood, of course, that my invention is not limited in any way to the structural details herein described, and that numerous changes, modifications, and use of equivalents may be resorted to without departure from the spirit and scope of the appended claims.

I herewith claim:

1. In gearshifting mechanisms, in combination, a shift actuating member, two ratio shifter groups made operative or inoperative by a shift controlling mechanism embodying two independently movable shift determining elements one element of which provides selective presetting movement for said member to establish ratio shift in one of two shifter groups while being positioned to prevent shift in the other group, the other element of which compels actuation within that shifter group selected by said first element, a hand control arranged to rock selectively in the first presetting direction of movement and to rotate transversely thereto for operating the said other element for shift actuation, and divided connecting means joining said control and said independently movable elements one of which means moves the first of said elements and the other of which moves the second of said elements independently from the motion applied to said first named element.

2. In remote gear selecting and actuating controls, in combination, variable speed gearing, a shifter control effective to select and shift said gearing by rocking and rotational motion respectively, shift permitting and actuating mechanism connected thereto embodying mechanical linkage operative by rotation of said control to engage and disengage positively driving elements of said gearing according to motion in one direction of said control, said mechanism including a device for presetting fulcra for the actuation motion of said mechanism, and embodying a separately acting flexible means arranged to preset selective groups of said gearing according to coplanar motion in another direction of said control.

3. In remote controls for variable speed gearing, in combination, step ratio gearing affording selective drive, a manual control mechanism embodying a unitary lever connected by linkage to a laterally movable plate arranged to establish fulcra for the motion of said gearing in engaging and disengaging direction and to lock certain groups of said gearing against motion, a shifter element effective to provide said motion, means moved by said control mechanism when moved in one direction of motion operative to transmit said motion, and means embodying a flexible element likewise moved by said control mechanism when moved in a direction opposite to said first named motion operative to preset said plate for selective shifting of gear groups while locking certain groups against motion.

4. In remote controls for motor car transmissions, in combination, variable speed gearing embodying shifter mechanism, a manual control for said gearing, a shifter member operative to actuate said mechanism for driving engagement and disengagement, a flexible force transmitting means connected to said control, a shiftable plate element movable by said means from a non-active position to either of two positions in which it may preset one of two fulcra for said member, a cam element arranged to transmit gear engaging and disengaging motion to said member when said plate element is in either of the two said positions, and separately acting means connecting said control with said cam element effective to transmit actuation motion to said gearing.

5. In remote controls for variable speed transmissions, in combination, a hand control movable rotationally to engage and disengage positively driving gearing for selection of step speed ratios, a flexible member movable by said control along the axis of said rotation to preset selected groups of said gearing, rotatable shifter mechanism for said gearing arranged to transmit directly thereto the rotational motion of said control, and means moved by said member to limit shift actuation of said mechanism by said rotational motion to the said selected groups while preventing shift actuation of said mechanism by rotational motion of said control of the unselected groups of said gearing.

6. In remote controls for motor vehicle drives, in combination, step ratio variable speed gearing, a selecting and actuating control therefor having rotational and rocking motion, connected to a yielding means moved by said control in the direction of the axis of said rotation and along said axis adapted to independently preset selected groups of said gearing for shift actuation, separate shifter means for said gearing arranged to translate rotation motion of said control into shift actuation, and mechanism moved by said yielding means operative to limit said actuation to the said selected groups.

7. A motor vehicle having a flexibly mounted power plant including a variable speed driving gear, a rocking and rotating control for said gear mounted on a member attached to the framing of said vehicle and having rotational gear group selecting and shift actuation motion, universally jointed linkage arranged to transmit the rotational shift actuation movement of said control to shift said gear, and a yielding flexible means operative to transmit the group selecting rocking motion of said control to said gearing, while compensating for relative motion between said power plant and said framing.

8. In remote controls for motor vehicle drives, in combination, a step ratio gearbox, a shifter embodied therein, a plate movable in a plane at right angles to the vertical centerplane of said gearbox, a shaft mounted transversely to the centerline of said gearbox, a second shaft mounted parallel to said first named shaft, linkage joining said shafts effective to transmit rotation of said first shaft into inverse rotation of the second shaft, gear shift actuation means moved by said second shaft, a lever attached to said first shaft movable from a mid-position to one of two limit positions thereby to establish drive by said gearing, and control means arranged to reciprocate said plate from a mid-position to preset said means for establishing said drive.

9. In remote controls for motor vehicles, in combination, a motor vehicle steering column, a transmission ratio control mounted on said column, movable in two directions, gearshift selecting and actuating mechanism connected to said control embodying separate selection and actuation compelling elements, a gearbox having a plurality of shiftable members for changing speed ratio actuated by one of said elements, and connecting means separately joining each of said elements to said control effective to translate motion thereof in one direction for selection, and motion in the other direction thereof for shift actuation, said means including a flexible transmitting device operative on said selection element to lock one member against motion while permitting motion of another member.

10. In remote controls for gearshift mechanism, in combination, a gearbox embodying variable speed gears selected by groups and including two translating members, one for each of said groups, a control mechanism for said gearbox including a unitary manual lever for selecting and actuating gear elements within said gearbox, a gearbox embodying an interlocking device subject to manual effort applied to said lever shiftable laterally to one of two active positions to permit actuation only of one of said members while preventing actuation of the other of said members, and a flexible wire moved axially by said control lever in one direction of motion operative to shift said device laterally to one of said two positions for said permissive and locking actions whereby said device directly inhibits the translation of the other of said members.

11. In remote controls for variable speed gears, in combination, a step ratio gearing, mechanical control means for said gearing including a member mounted on said steering column having a first motion in a plane in which the axis of said column lies, and a rotary second motion parallel to said plane, a gearbox enclosing said gearing including shifter mechanism subject to said control, two elements within said gearbox, one arranged to permit selection of speed ratio by groups while preventing actuation of a group not selected, the other element arranged to actuate shift for gear engagement and disengagement with the drive, means connecting the first of said elements separately with said control effective to move the element directly according to the said first motion, and independent means connecting the second of said elements with said control effective to move the element directly according to the second said motion thereof.

12. In remote controls for vehicle transmissions, in combination, a vehicle steering wheel mounted on a steering column, a mechanically operating gearing control arranged beneath said steering wheel to move relatively thereto, brackets supported by the column beneath said wheel including bearing members, a hollow shifter shaft moved by said control mounted to rotate in said bearings parallel to said column, mechanically operative gearshift actuation means moved by rotation of said control and said shaft, a translating member movable axially and freely in the bore of said shaft by rocking only of said control at right angles to the said rotation motion thereof, and a preset device moved only by said member effective to limit shift of said means to selected gear groups.

13. In variable speed gearing controls, in combination, a hollow shaft rotatable in supporting bearings, an extension member fixed to rotate with said shaft through a limited arc of motion, a lever pivoted in said member, translating means movable freely in the bore of said shaft for converting rocking motion of said lever into compression or tension forces, a shifter mechanism arranged to convert rotational motion of said member and said shaft indirectly and mechanically into gear engaging and disengaging motion, and yielding means moved axially by said translating means effective to preset the selective motion of said mechanism.

14. In remote controls for vehicle transmission, in combination, a step ratio gearing subdivided into two separate driving groups, a control therefor, including a first rocking motion arrangement by which selection of one of the said two groups is obtained while locking of the other of said groups is established, the arrangement including a single element translatable to permit and prevent individual operation of one of said groups, and including a second rotating motion arrangement by which both selection and actuation of gear engagement within the group selected by said first motion is obtained, the positioning of said element affording fulcra for the action of said second motion arrangement, a single ratio shifting means exclusively operated by said second arrangement, and independent means acting separately connecting said first arrangement with said element whereby selective motion of said control is effective to provide sequential motion by said arrangement in shifting from no drive to drive through the groups of said gearing.

15. In remote controls for shift gearing, in combination, a frame, a power plant flexibly mounted on said frame, a member attached to said frame, a step ratio gearing having at least two separate actuating means, a rocking and rotating control for said gearing, a casing for said gearing coincident with said power plant, a presetting and locking member mounted on said casing arranged to preset one of said means for ratio shift actuation while locking another of said means against shift actuation, the rocking of said control being adapted to position said member, a shift actuating element movable by said control mounted on said member and connected to shift the ratio of said gearing, and a flexible yielding connection joining said control to said member for presetting and locking action whereby vibratory motion of said power plant induces a minimum of resulting motion in said control.

16. In remote controls for variable speed gearing, in combination, the steering column of a vehicle, a shifter control handle movable in the surface of a torus whose smaller radius is one arm of said handle, the larger radius and plane of said torus being approximately perpendicular to the centerline of said column, gearshift permitting and actuating mechanism connected to said handle for positive shift action in direct response to manual force applied to said handle embodying a first manually operable means manually operative to engage and disengage positively driving gearing according to motion in the larger radius direction of said handle in said surface, and embodying a second means arranged to limit shift selection to predetermined gearing groups according to motion in the smaller radius direction of said handle in said surface.

ARTHUR A. RUBLY.